Aug. 7, 1962   L. E. BERGGREN   3,048,329
AIRCRAFT INSTRUMENTS
Filed March 17, 1958   6 Sheets-Sheet 1

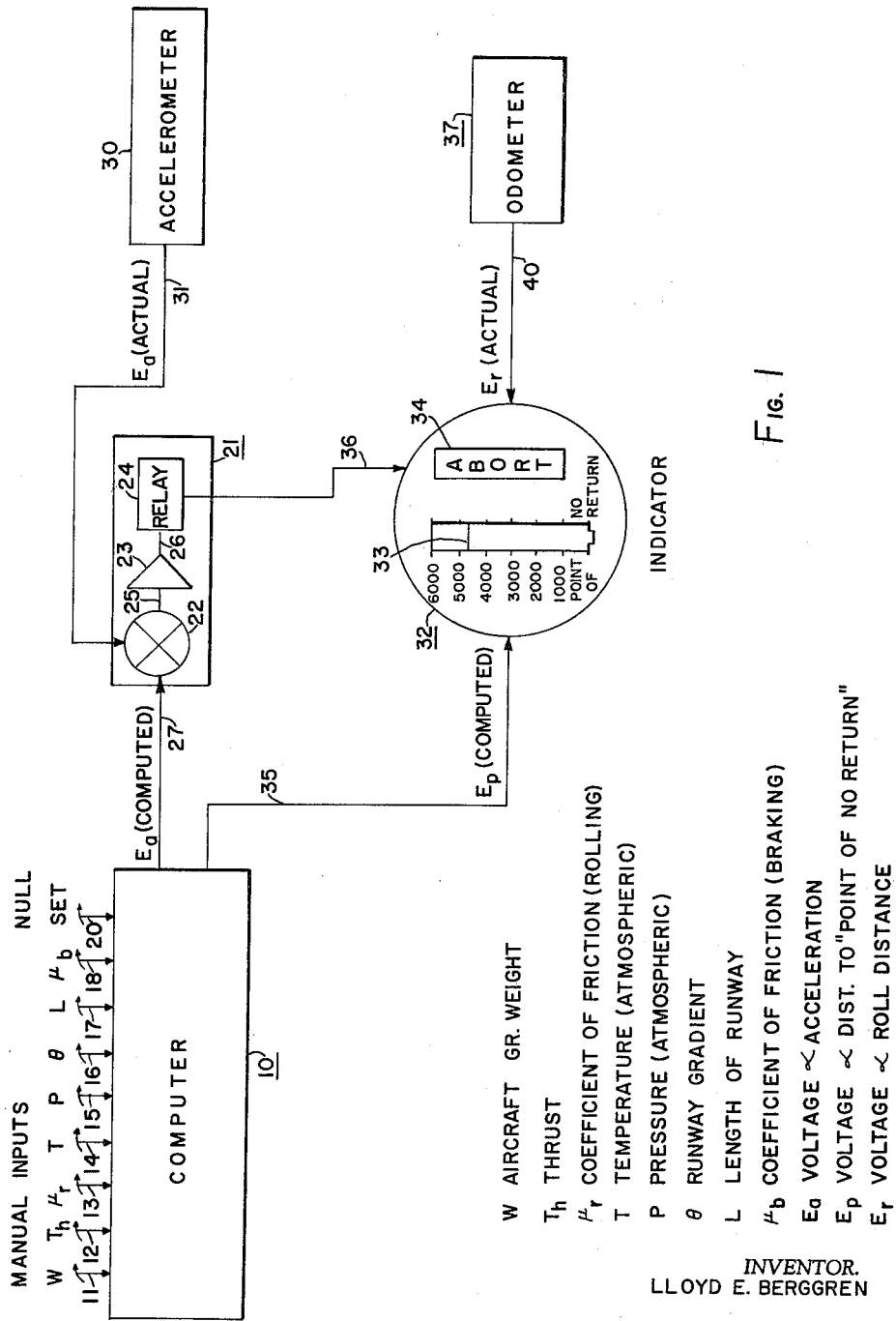

Fig. 1

W   AIRCRAFT GR. WEIGHT
$T_h$   THRUST
$\mu_r$   COEFFICIENT OF FRICTION (ROLLING)
T   TEMPERATURE (ATMOSPHERIC)
P   PRESSURE (ATMOSPHERIC)
$\theta$   RUNWAY GRADIENT
L   LENGTH OF RUNWAY
$\mu_b$   COEFFICIENT OF FRICTION (BRAKING)
$E_a$   VOLTAGE $\propto$ ACCELERATION
$E_p$   VOLTAGE $\propto$ DIST. TO "POINT OF NO RETURN"
$E_r$   VOLTAGE $\propto$ ROLL DISTANCE INVENTOR.
LLOYD E. BERGGREN
BY Roger W. Jensen
ATTORNEY

NULL SET

INVENTOR.
LLOYD E. BERGGREN

ATTORNEY

Aug. 7, 1962 L. E. BERGGREN 3,048,329
AIRCRAFT INSTRUMENTS
Filed March 17, 1958 6 Sheets-Sheet 3

INVENTOR.
LLOYD E. BERGGREN
BY Roger W. Jensen
ATTORNEY

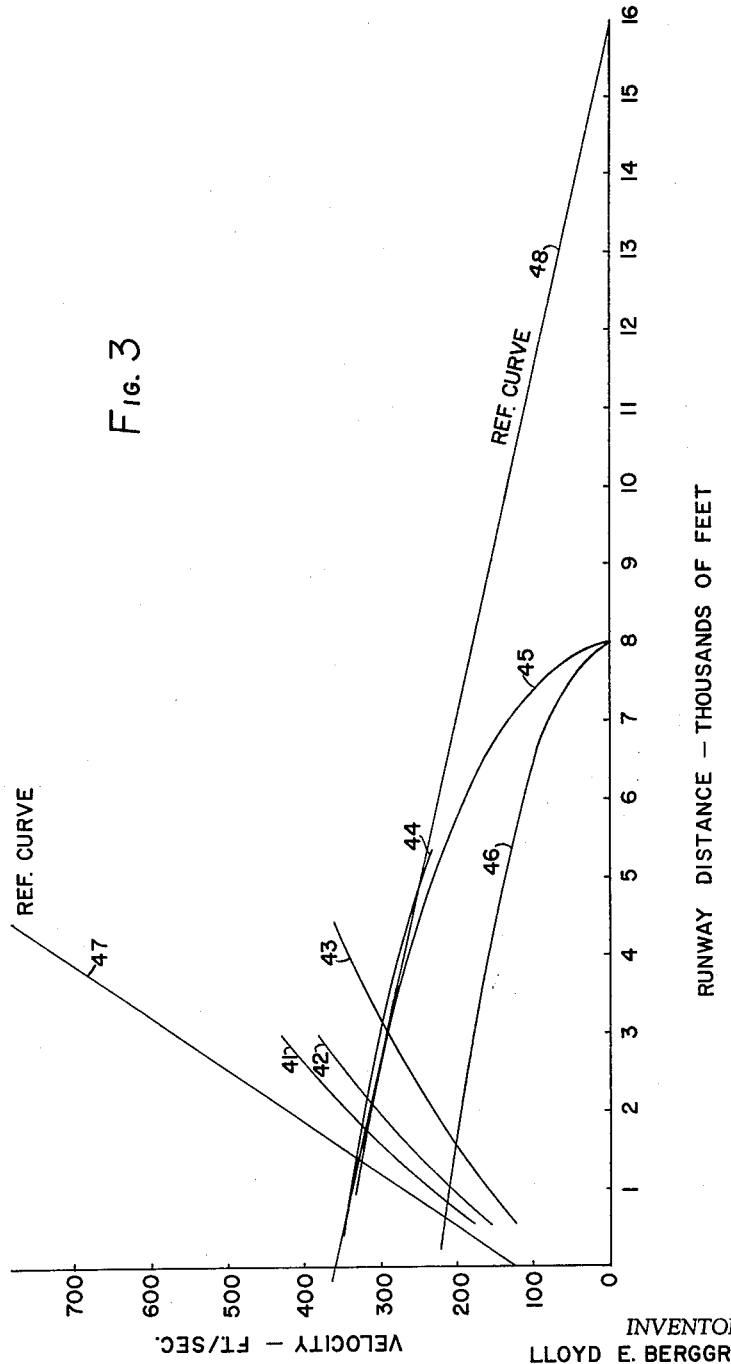

Aug. 7, 1962     L. E. BERGGREN     3,048,329
AIRCRAFT INSTRUMENTS
Filed March 17, 1958     6 Sheets-Sheet 5
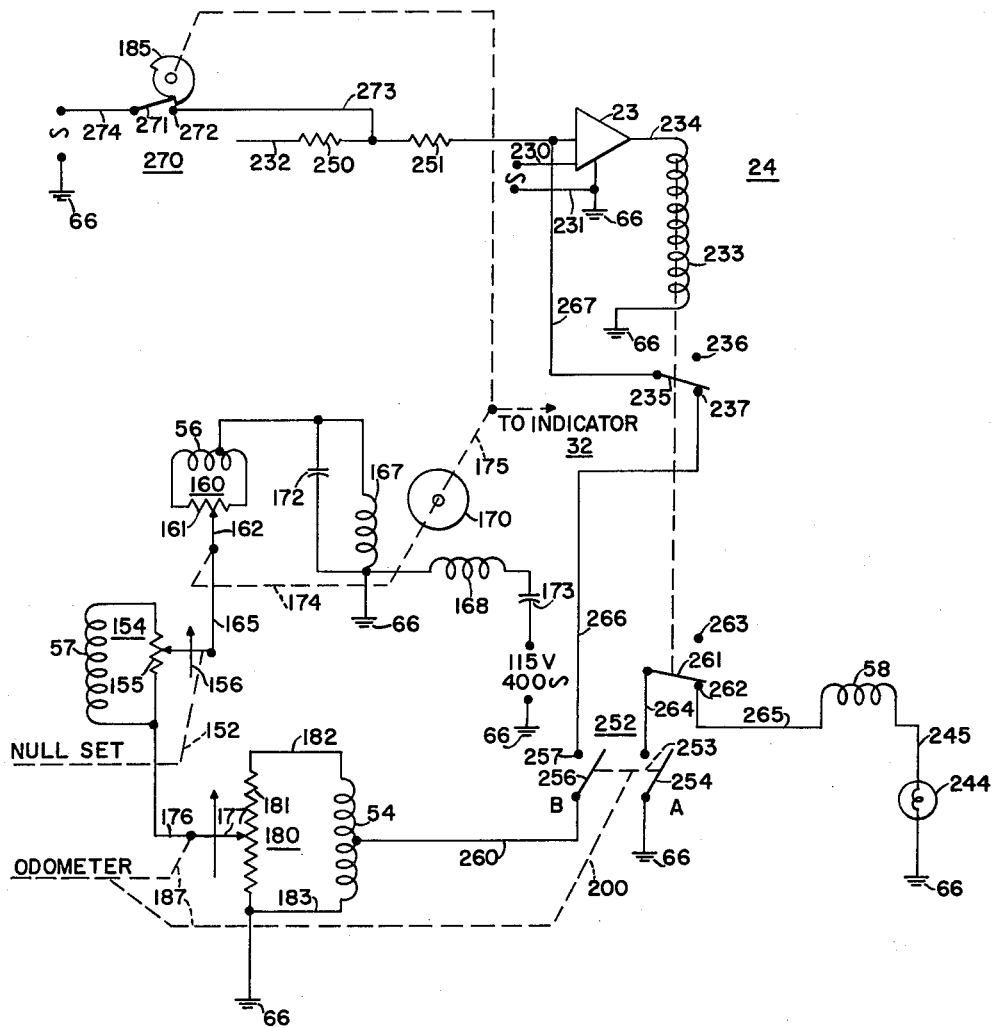
FIG. 4
INVENTOR.
LLOYD E. BERGGREN
ATTORNEY Aug. 7, 1962  L. E. BERGGREN  3,048,329
AIRCRAFT INSTRUMENTS
Filed March 17, 1958  6 Sheets-Sheet 6

INVENTOR.
LLOYD E. BERGGREN
BY Roger W. Jensen
ATTORNEY

United States Patent Office 3,048,329
Patented Aug. 7, 1962

3,048,329
AIRCRAFT INSTRUMENTS
Lloyd E. Berggren, Minneapolis, Minn., assignor to Minneapolis-Honeywell Regulator Company, Minneapolis, Minn., a corporation of Delaware
Filed Mar. 17, 1958, Ser. No. 722,062
27 Claims. (Cl. 235—151)

This invention relates to the field of aviation instruments and is more particularly related to an aircraft take-off monitor.

Statistics relating to major accidents in the operation of high performance aircraft indicate that 25 to 30 percent of such accidents occur during take-off. The advent of jet-powered aircraft has made it more difficult for the pilot to monitor the take-off. This situation stems from the fact that in jet-powered aircraft, the pilot does not have, to any degree, sensory signals of vibration and noise by which performance can be judged. As a result, situations can develop during take-off in which aircraft performance decreases to the critical point without the pilot being aware of the fact. In the interest of safety, therefore, it becomes necessary, particularly in this type of aircraft, to provide instrumentation to assist the pilot in monitoring the take-off.

To adequately monitor a take-off, the pilot should be given information which will tell him:

(1) Whether or not his take-off is progressing normally, (2) Whether or not he can stop the aircraft on the remaining runway.

The primary criterion of whether or not a take-off is progressing normally is the acceleration of the aircraft. An inadequate acceleration can stem from reasons other than reduced engine thrust. For example, dragging wheel brakes, improper operation of related aircraft facilities such as wing flaps and speed brakes, and accumulation of snow or water on the runway all affect the acceleration of the aircraft.

While the acceleration of the aircraft is an important factor, it is also known that generally pilots normally do not have a good feel for the distance required to stop the aircraft under emergency conditions or for the amount of runway remaining. The resolution of this problem will assist the pilot in making the proper decision under such emergency conditions. For example, if during an otherwise normal take-off, the pilot observes an aircraft moving into his projected flight path, he must decide whether to take-off and maneuver to avoid collision or abort the take-off. With no adequate system to assist him in making his decision, he may easily make the wrong decision. However, if he can readily ascertain whether or not he has sufficient runway remaining to bring his aircraft to a stop, he can make the correct decision immediately. In appraising the value of the information provided by the take-off monitor it should be remembered that pilots seldom are required to make emergency stops and hence they are not qualified on the basis of experience to estimate stopping distances and remaining runway distances to determine whether or not a safe stop is possible.

My invention provides a pilot with a positive indication of whether to take-off or stop in the event that the sub-marginal aircraft performance is detected during a take-off roll, prior to reaching a point where the pilot is committed to take-off or stop. This point has been designated as a point of no return. In addition, the system furnishes continuous information on an indicator mounted on the cock-pit instrument panel which tells the pilot where his aircraft is with respect to this point during the take-off roll. The warning signal to stop may be in the form of a visual or audio signal and the pilot need refer to his position indicator only if a decision, occasioned by some event or situation not reflected in aircraft acceleration, must be made as to whether he should take-off or stop. Sub-marginal acceleration will always automatically result in an abort signal if the aircraft has not passed the point of no return.

The present system compares the actual acceleration of the aircraft to an arbitrarily established minimum which would probably be a percentage of the normal acceleration for the prevailing condition. If the actual acceleration is less than the minimum established above, an abort signal is generated provided that the distance measured from the end of the runway is not greater than that computed for the point of no return.

Therefore it is a general object of the present invention to provide an instrument which monitors the aircraft acceleration and distance traveled down the runway to provide information indicating whether the aircraft should take-off or stop.

It is another object of the present invention to provide an instrument which has a computer to predetermine the minimum normal acceleration for the take-off under the prevailing conditions.

It is a further object of the present invention to provide an instrument which has a computer to determine the velocity of the aircraft during the take-off run.

It is still another object of the present invention to provide an instrument which has a computer to determine the velocity of the aircraft during the braking run.

Another object of the present invention is to provide an instrument which has a computer to compute the distance from the beginning of the runway to the point of no return for the prevailing conditions of aircraft weight, thrust configuration, air temperature and pressure, runway gradient, and wind.

It is still another object of the present invention to provide an instrument which has an indicator to show the pilot how much distance remains from the origin of the runway to the point of no return.

These and other features of the invention will be understood more clearly and fully from a following detailed description and accompanying drawings in which:

FIGURE 1 is a block diagram showing the general configuration of the take-off monitor;

FIGURE 3 is a graphical presentation of the actual velocities encountered and the approximation of these velocities as employed in the computer;

FIGURE 4 is a schematic diagram of the indicator and associated circuits which provide further refinements to the circuit as shown in FIGURE 2;

Figure 2A:
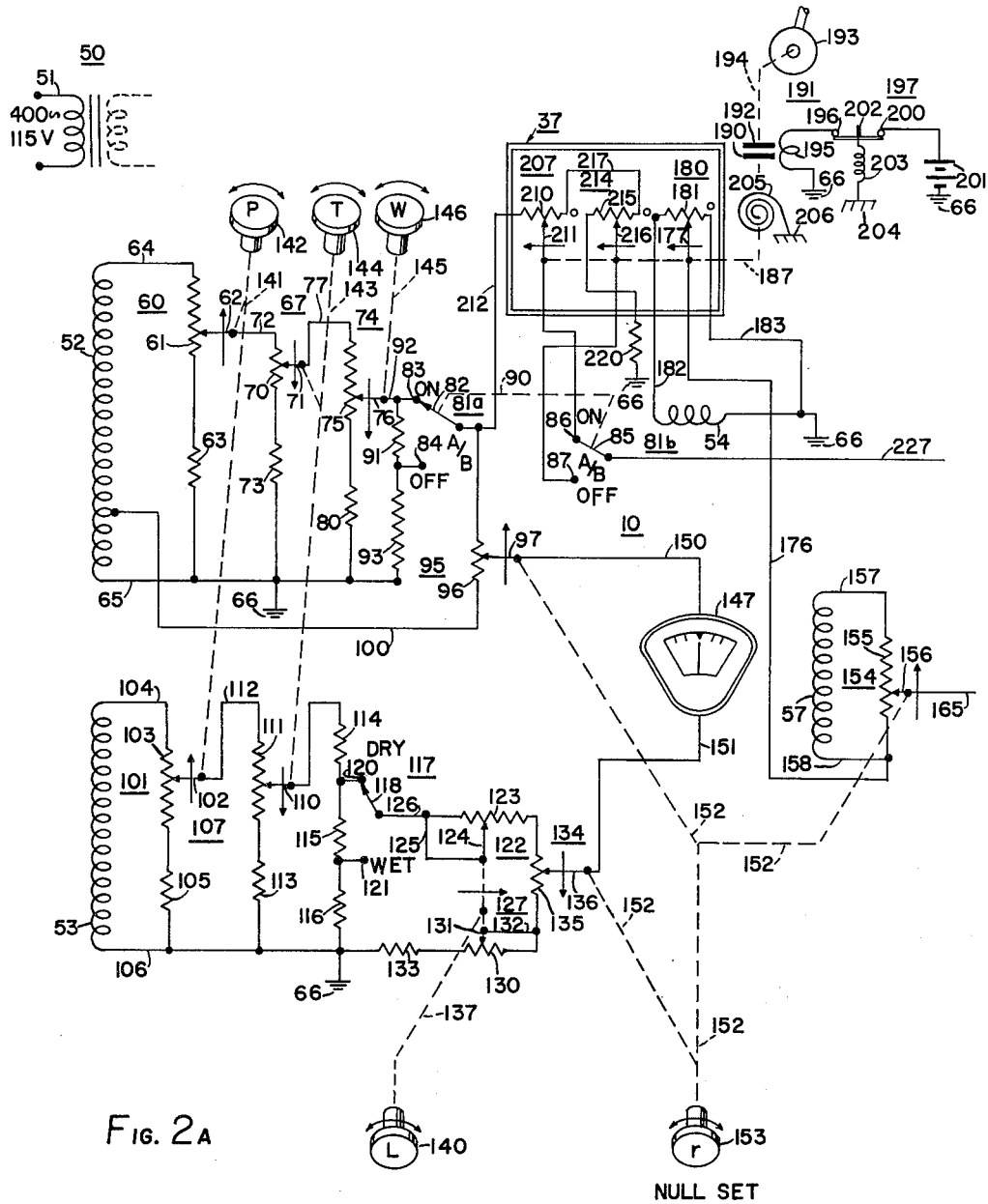
FIGURE 2A and 2B are a schematic drawing of the take-off monitor showing the various components and their relation to each other.

FIGURE 1 shows a computer 10 having a plurality of manual inputs. These inputs are set into the computer on eight different shafts which are as follows: aircraft gross weight 11, aircraft thrust 12, coefficient of rolling friction 13, atmospheric temperature 14, atmospheric pressure 15, runway gradient 16, runway length 17, and coefficient of braking friction 18. Computer 10 also has a shaft 20 which provides a null setting function as will be explained later. An abort signal generator 21 comprises a comparator or electrical differential 22, an amplifier 23, and a relay 24. Differential 22 is connected to amplifier 23 by a connecting means 25 and amplifier 23 is connected to relay 24 by a connecting means 26. Differential 22 is connected to computer 10 by a connecting means 27. An accelerometer 30 is also connected to differential 22 by a connecting means 31. An indicator 32 has a scale 33 and a warning light 34 which are used to inform the pilot of the existing take-off conditions. As computer 10 is adjusted in accordance with the various inputs, and null set shaft 20 is adjusted, a point of no return is computed. This indicator 32 receives a signal representative of the distance to the point of no return from computer 10 through a connecting means 35 and further receives a signal from relay 24 through a connecting means 36 which is sent to the warning light 34. An odometer 37 provides an output signal representative of the runway distance traveled by the aircraft on a connecting lead 40 which is connected to the scale portion 33 of indicator 32. Thus the warning signal to abort the take-off run is indicated on the warning section 34 of indicator 32 if the actual acceleration is less than the computed acceleration as long as the point of no return has not been indicated by scale 33 and this is determined by subtracting the distance actually measured by odometer 37 from the distance to the point of no return computed in computer 10.

The block diagram just referred to indicates the basic variables that affect take-off and braking performance. It has been found generally that the acceleration of an aircraft taking off, with a constant attitude angle, may be expressed as:

$$a_x = \frac{F_{st}}{W} - \mu - \frac{q}{W}\left(C_D S - \mu C_L S - \frac{dF}{dq}\right) \qquad (1)$$

Where:
$a_x$=longitudinal acceleration (in $g$'s) referred from airplane axis to horizontal plane (ft./$s^2$).
$F_{st}$=static engine thrust (lb.)
$W$=airplane weight (lb.)
$\mu$=coefficient of friction (rolling)
$q$=dynamic pressure lb./sq. ft.
$C_D$=drag coefficient
$S$=wing area (sq. ft.)
$C_L$=lift coefficient
$\frac{dF}{dq}$=rate of change of thrust with dynamic pressure (sq. ft.)

Similarly, it may be shown that the deceleration required for an aircraft to stop may be expressed as:

$$a_x' = \mu_b - \frac{q}{W}(C_D - \mu_b C_L)S \qquad (2)$$

Where:
$a_x'$=longitudinal deceleration (in $g$'s) referred from airplane axis to horizontal plane (ft./sec.$^2$)
$\mu_b$=coefficient of friction (braking)

Since the runway inclination was assumed to be zero and constant, it will be noted that the above expressions do not contain any terms defining runway inclination or wind. By integrating the above equations the necessary equations of take-off velocity and braking velocity may be obtained, however it is sufficient to say that the equations contain exponential terms and are functions of the conditions shown in the block diagram of FIGURE 1. In order to show the general shapes of the curves, several of the take-off velocity curves have been plotted as a function of runway distance and these are shown as curves 41, 42, and 43 in FIGURE 3. Curve 41, for example, represents the velocity of an aircraft as it proceeds down the runway, under particular conditions of weight, thrust, temperature, etc. Curves 42 and 43 represent the velocity under other sets of conditions.

There is, of course, a direct correlation between the velocity of the craft at any given time, and the distance within which it can be stopped by maximum braking. For example, under one set of conditions of drag, friction, weight, etc., it has been found that a particular plane requires approximately 5500 feet to stop on a dry runway when brakes are applied at 300 miles per hour. Thus, if the runway is 8000 feet long, brakes must be applied approximately 2500 feet from the starting point in order to stop the plane before it reaches the end of the runway. The same plane, if traveling at 250 m.p.h., can be stopped on the same runway in approximately 3700 feet. Curve 45 on FIGURE 3 is representative of these characteristics, and is one of a family of braking velocity curves. Braking velocity curves 44 and 46 are representative of other conditions of runway, drag, etc.

In FIGURE 3, in order to properly explain my invention, I have shown reference curves for three sets of conditions. The set of conditions are the same for curves 41 and 44, with a second set of conditions determining curves 42 and 45 and still a third set of conditions determining curves 43 and 46. Specifically, curve 46 has a value of braking coefficient $\mu_b$ for a wet runway condition. Thus, as the plane proceeds down the runway, curve 43 indicates that it will reach 200 miles per hour approximately 6300 feet from the far end. Unless brakes are applied at that point, the plane will not stop before reaching the end of an 8000 foot runway, as indicated by curve 46. This point, at which brakes must be applied in order to stop within the remaining length of runway, as indicated by the intersection of the take-off velocity and braking velocity curves, is defined as the point of no return.

It may be noted by inspecting the curves of FIGURE 3 that in the operating ranges, or ranges where the curves intersect, that the curves themselves approximate a linear function. From this observation, it therefore appears that it is not necessary to develop a computer which would supply a signal as a function of the actual velocity curves but that a signal representative of a linearized approximation to the velocity curves will be sufficient to provide accurate results. With this thought in mind, a straight line curve which approximates the actual curve has been drawn and is designated as curve 47 for the take-off velocity and curve 48 for the braking velocity. By altering the slope of the linearized curves in accordance with the conditions shown in FIGURE 1, curves 47 and 48 would change their slopes as the conditions were varied. Hence, it becomes necessary to build only a computer which starts with initial conditions of velocity and modifies these initial conditions in accordance with the conditions which surround the aircraft at the time of take-off. In other words, the take-off velocity which is represented by curve 47 would be modified in accordance with ambient temperature T, ambient pressure P, gross weight of the aircraft W, and static thrust $F_{st}$ all of which are modified by runway distance $r$. This is expressed analytically, for a given airplane, as $$V_r = 125 + \left(0.169 \frac{T_0}{T} \frac{P}{P_0} \frac{W_0}{W} \frac{F_{st}}{F_{st_0}}\right) r \qquad (3)$$

Where:
$V_r$=velocity during take-off in ft./sec.
$T$=ambient temperature in ° Rankine
$P$=ambient pressure in lbs./sq. in.
$W$=gross weight of aircraft in lbs.
$F_{st}$=static engine thrust (with or without afterburner) in lbs.

$T_0$=a reference temperature of 395° Rankine
$P_0$=a reference pressure of 15.5 pounds per sq. in.
$W_0$=a reference weight for a given aircraft, (in this case 47,000 lbs.)
$F_{st_0}$=a reference thrust for a given aircraft, (in this case 64,100 lbs.)
$r$=distance traveled down runway (ft.)

In like manner an equation is developed for curve 48 which approximates the straight line portions of the actual curves of braking velocity and this is expressed analytically as:

$$V_b = [L+8000) - r] (0.0226\ T_f, P_f, \mu_b) \qquad (4)$$

Where:

$V_b$=velocity during the braking run in ft./sec.
$L$=runway length in ft.
$r$=distance down runway in ft.
$T_f$=temperature correction factor
$P_f$=pressure correction factor
$\mu_b$=braking coefficient of friction factor
0.0226=the slope of curve 48 at $T$=590° R., $P$=15.5 p.s.i. and $\mu$=0.30

Figure 5:
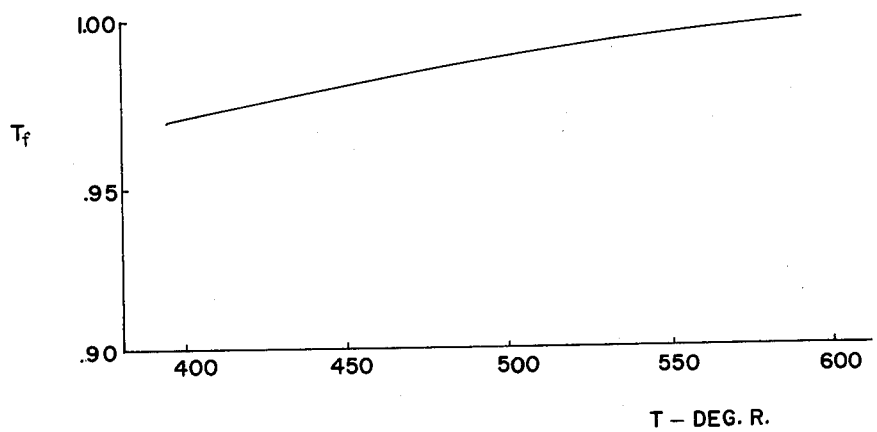
FIGURE 5 is a graphical presentation of the relation of a temperature correction factor $T_p$ to ambient temperature.
Figure 6:
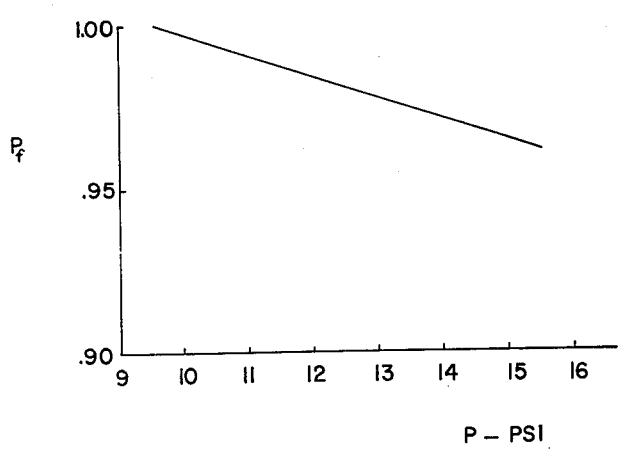
FIGURE 6 is a graphical presentation of the relation of a pressure correction factor $P_f$ to ambient pressure.

The relationship between $T_f$ and $T$ is shown in FIGURE 5 and the relationship between $P_f$ and $P$ is shown in FIGURE 6. Another way of describing the straight line approximation is to say that Equation 3 would represent curve 47 and could be designated as a reference curve where the relationships of temperature T, pressure P, weight W, and thrust $F_{st}$ are all unity when compared to their proper reference quantities of $T_0$, $P_0$, $W_0$ and $F_{st_0}$. The equation would be expressed as:

$$V = 125 + 0.169r$$

which would hold true for the arbitrary conditions selected as reference values. Any deviation from these reference values would then modify the slope of curve 47 and for an appropriate set of conditions would approximate curves 41, 42, and 43.

In like manner, Equation 4 would become:

$$V_b = [(L+8000) - r] 0.022 \mu_b$$

where the temperature correction factor and pressure correction factor are both unity, and this would represent the linearized curve 48 which could also be designated as a reference curve. Then as any one or all quantities of temperature, pressure, and braking coefficient were other than unity, the slope of curve 48 would be modified to approximate that of curve 44, 45, or 46.

As was previously stated the same set of conditions are used to determine both the velocity curve for the take-off run and the associated acceleration curve and a second set of conditions is used to determine braking velocity curve. The quantities are related as the terms of both acceleration and velocity contain exponential functions and therefore only a constant and scale factor is needed to show the difference between the linearized acceleration curve and the linearized take-off velocity curve, both of which are functions of the same input conditions. Since the acceleration contains exponential terms, an approximation to this exponential term may be determined by taking the first two terms from a Maclaurin series expansion. From this information, an approximation may be made to the acceleration which is $$A_x = \left(\frac{F_{st}}{W} - \mu\right) + r\left[K\left(\frac{F_{st}}{W} - \mu\right)\right] \qquad (5)$$

Using the following values of reference conditions:

$F_{st}$=64,100 lb.
$T_0$=395° R.
$P_0$=15.5 p.s.i.

Using the same technique to modify the value of acceleration given in terms of gravity ($g$) as applied to take-off velocity, Equation 5 may then be expanded to:

$$A_x = \left(\frac{F_{st}}{W_0}\frac{P}{P_0}\frac{T_0}{T}\frac{W_0}{W}\frac{F_{st}}{F_{st_0}} - \mu\right) + r\left[K\left(\frac{F_{st_0}}{W_0}\frac{P}{P_0}\frac{T_0}{T}\frac{W_0}{W}\frac{F_{st}}{F_{st_0}} - \mu\right)\right] \qquad (6)$$

Where:

$A_x$=acceleration in gravity units ($g$)
$F_{st_0}$=64,100 lb.
$P_0$=15.5 p.s.i.
$T_0$=395° R.
$W_0$=47,000 lb.
$\mu$=.03$g$ (constant)
$r$=runway distance in ft.

$$K = 0.0000244\left(\frac{1}{\text{ft.}}\right)$$

$F_{st}$=64,100 lbs. (with afterburner A/B)
$F_{st}$=46,100 lbs. (no afterburner A/B)
$P$ range=9.5 to 15.5 p.s.i.
$T$ range=395° to 590° R.
$W$ range=47,000 to 60,000 lbs.

It may be noted that the term $\mu$ is a rather insignificant term when compared to the other factors and for the particular application this term has been dropped and does not appear in the equations or in the computer. It can be assured that the acceleration of the aircraft will reach the value indicated in the first term of Equation 6 which is a constant value, and the second term will algebraically add to the acceleration designated in the first term as a function of runway length.

Figure 2B:
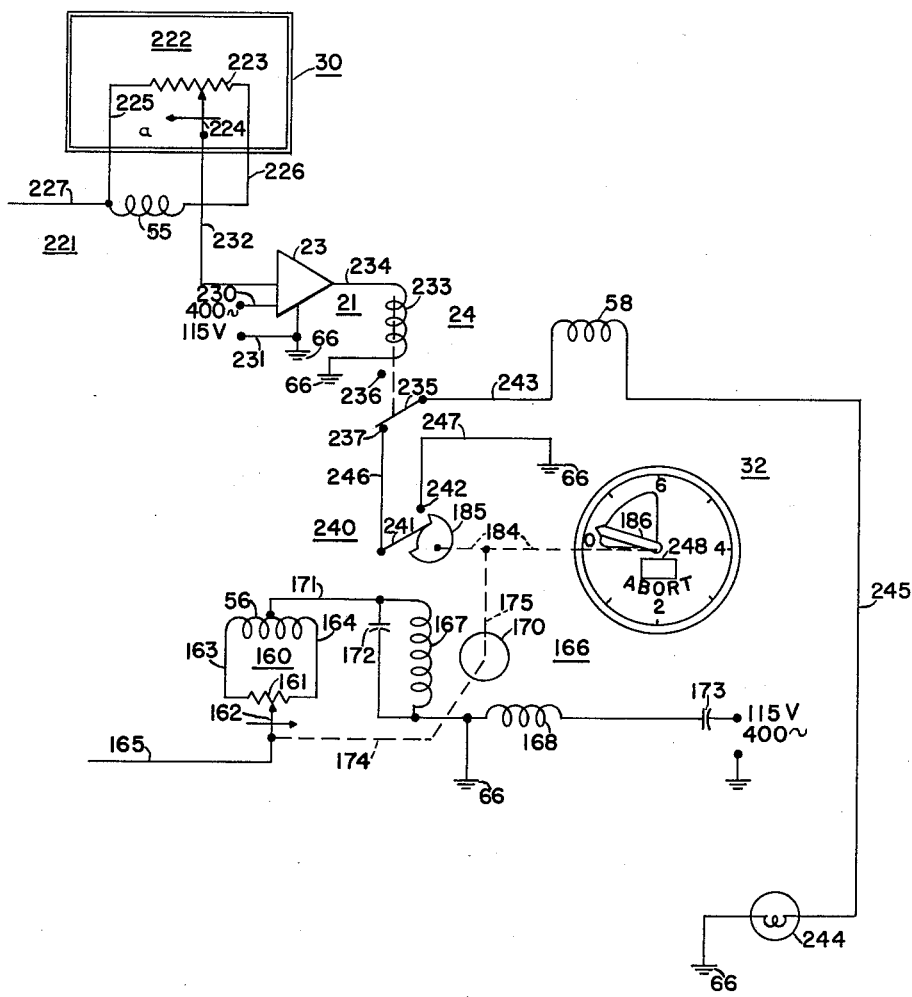

Having reviewed the necessary approximations made to the accelerations and velocities encountered, the computer will now be considered along with the rest of the system for producing the desired result. Referring to FIGURE 2, a transformer 50 has a primary winding 51 which is excited by an alternating voltage and seven secondary windings 52, 53, 54, 55, 56, 57, and 58. A potentiometer 60, comprising a resistive element 61 and a wiper arm 62 has its resistive element 61 connected on one to a resistor 63. Resistive element 61 has its other end connected to transformer winding 52 by a connecting lead 64 and the other end of resistor 63, opposite that connected to resistive element 61, is connected to transformer winding 52 by a connecting lead 65. Connecting lead 65 is connected to ground 66. A potentiometer 67 comprising a resistive element 70 and a wiper arm 71 has one end of resistive element 70 connected to wiper arm 62 by a connecting lead 72 and has the other end of resistive element 70 connected to a resistor 73 which is connected to ground 66 on its other end. Another potentiometer 74 comprising a resistive element 75 and a wiper arm 76 has one end of resistive element 75 connected to wiper arm 71 by a connecting lead 77. The other end of resistive element 75 is connected to a resistor 80, which has its opposite end connected to ground 66. A switch 81 is made up of two parts, 81a and 81b, which are ganged together. Switch 81a comprises a switch arm 82 and a pair of contacts 83 and 84. Switch 81b comprises a switch arm 85 and a pair of contact points 86 and 87. Switch arms 82 and 85 are connected by a common link 90. A resistor 91 is connected between switch contacts 83 and 84 and switch contact 83 is connected to wiper arm 76 by a connecting lead 92. Switch contacts 84 is connected to ground 66 through a resistor 93. Potentiometer 95 comprising a resistive element 96 and a wiper arm 97 has resistive element 96 connected to switch arm 82 on one end and has the other end of resistive element 96 connected to a tap of transformer winding 52 by a connecting lead 100.

A potentiometer 101 comprises a wiper arm 102 and a resistive element 103 which has one end connected to transformer winding 53 through a connecting lead 104 and has its other end connected to ground 66 through a resistor 105. The other end of transformer winding 53 is also connected to ground 66 through a connecting lead 106. A potentiometer 107 comprises a wiper arm 110 and a resistive element 111 which has one end connected to wiper arm 102 by a connecting lead 112. Since the relationship of $T_f$ with respect to T is slightly non-linear as seen from FIGURE 5, it may be necessary to characterize resistive element 111 so that the value of resistance representative of ambient temperature T corresponds to the function of the temperature correction factor $T_{fo}$. Where the curve is linear this will not be necessary. Another solution is to adjust wiper arm 110 separately from that of wiper arm 71 and in this case, the scale of ambient temperature T associated with wiper arm 110 can be made non-linear to achieve the same result as characterization of resistive element 111. The other end of resistive element 111 is connected to ground 66 through a resistor 113. A resistor 114 is connected to wiper arm 110 on one end and has its other end connected to a resistor 115, which in turn is connected in series with a resistor 116 which is connected to ground 66. A switch 117 comprises a switch arm 118 and a pair of contact points 120 and 121. Contact points 120 and 121 are connected across resistor 115. A potentiometer 122 comprises a resistive element 123 and a wiper arm 124, which is connected to one end of resistive element 123 through a shorting lead 125 and this end of resistive element 123 is connected to switch arm 118 through a connecting lead 126. Another potentiometer 127 comprises a resistive element 130 and a wiper arm 131 which is connected to one end of resistive element 130 by a connecting lead 132. The opposite end of resistive element 130 is connected to ground 66 through a resistor 133. A potentiometer 134 comprising a resistive element 135 and a wiper arm 136 has its resistive element 135 connected to wiper arm 131 and to resistive element 123 on the end opposite connecting lead 126. Wiper arms 124 and 131 are driven by a common shaft 137 which is adjusted by a knob 140 in accordance with the length of the runway. In like manner, wiper arms 62 and 102 are driven by a common shaft 141 which is adjusted by a knob 142 in accordance with atmospheric pressure. Also, wiper arms 71 and 110 are adjusted by a common shaft 143 which is driven by a knob 144 in accordance with atmospheric temperature. Wiper arm 76 is positioned by a shaft 145 which is adjusted by a knob 146 in accordance with the gross weight of the aircraft. Switch 81 having sections 81a and 81b is positioned by common link 90 to a position indicating whether the jet engine afterburner is on or off. A null detector or null indicator 147 is connected to wiper arm 97 by a connecting lead 150 and connected to wiper arm 136 by a connecting lead 151. In order to change the voltage which appears on wiper arms 97 and 136, a common shaft 152, adjusts the wiper arms as knob 153, connected thereto, is adjusted in accordance with a predetermined runway distance measured from the origin of the runway. It is the adjustment of knob 153 which will allow null indicator 147 to be driven to its null point since wiper arms 136 and 97 are driven in opposite directions with respect to electrical ground 66.

A potentiometer 154 comprises a wiper arm 156 and a resistive element 155 which is connected to transformer secondary winding 57 by a pair of connecting leads 157 and 158. Another potentiometer 160 comprises a wiper arm 162 and a resistive element 161 which is connected to secondary winding 56 by a pair of connecting leads 163 and 164. Wiper arms 162 and 156 are electrically connected by a connecting lead 165. A motor 166 comprises a pair of field coils 167 and 168 and an armature 170. Control winding 167 has one end connected to ground 66 and the other end is connected to a tap of secondary winding 56 of transformer 59, by a connecting lead 171. A capacitor 172 is connected in parallel with control winding 167. One end of field excitation winding 168 is connected to ground 66 and the other end is connected to a capacitor 173 which is used as a phase shifting capacitor. The other end of capacitor 173 is connected to a common voltage source of alternating current and the circuit is completed by having the voltage source connected to ground 66. Any movement of armature 170 will be imparted to a pair of shafts 174 and 175 with 174 being connected to wiper arm 162. In order to complete the circuit in the control field winding of motor 166, a connection is made at one end of resistive element 155 through a connection lead 176, which is connected to a wiper arm 177 of a potentiometer 180 which is contained in odometer 37. Potentiometer 180 also contains a resistive element 181 which is connected in parallel with secondary transformer winding 54 by a pair of connecting leads 182 and 183. Connecting lead 183 is further connected to ground 66. Assuming for the time being that wiper arm 177 is not being changed, any adjustment made to the null setting knob 153 will cause a shift in the voltage seen on wiper arm 156 and thus be transmitted to control winding 167 of motor 166 causing it to impart a rotation to armature 170. As 170 is rotated it in turn rotates shaft 174 to adjust wiper arm 162 and thereby reduce the voltage present on control winding 167 to a null value or essentially a zero value, thus causing the motor to be driven to a fixed position. As armature 170 is rotated, shaft 175 drives a common shaft 184 which is used to rotate a cam 185 and a pointer 186 of indicator 32. Thus in the operation just described, as armature 170 is rotated, pointer 186 would be adjusted to indicate a value of distance representative of the distance from the runway origin to the point of no return, assuming that the voltage appearing on wiper arm 177 is of a proper value. Wiper arm 177 is driven by a common shaft 187 which is attached to a plate 190 of a magnetic clutch 191 which has another plate 192 connected to an aircraft landing gear wheel 193 by a shaft 194. Magnetic clutch 191 also has a coil 195 which has one end connected to ground 66 and the other end connected to a switch contact 196 of switch 197. Switch 197 has another contact 200 connected to a battery 201, the battery completing the circuit by being connected to ground 66. A switch bar 202 of switch 197 is normally pressed against switch contacts 196 and 200 by a spring 203 which is rigidly fastened at point 204 but the circuit may be broken by pressing switch bar 202 to momentarily break the circuit and thereby deenergize clutch coil 195. After shaft 187 has been driven for any given distance which would be determined by the distance traveled by wheel 193, it becomes desirable to have shaft 187 returned to a reference point representing the origin of the runway or starting point and this is accomplished by having a spring 205 connected to shaft 187 and fixed at a point 206 which would return shaft 187 to an initial position upon the deenergization of clutch coil 195. Therefore, as the various quantities are set into computer 10, and after adjustment of null set knob 153 is initiated, pointer 186 of indicator 32 will be adjusted to a position representative of the null value of null indicator 147 which is nulled at a point representative of the runway distance from its origin, designated as the point of no return. This is accomplished since the voltages appearing on wiper arms 136 and 97 are representative of the braking velocity and take-off velocity respectively and these voltages are adjusted until they become equal and by observing the curves of FIGURE 3 it will be apparent that the only place that the voltages will be equal for a given displacement of wiper arms 97 and 136 is the point where the curves intersect. This is borne out by the fact that the curves have different slopes and therefore the voltages will not be equal for equal displacement in opposite directions of the wiper arms representing a runway distance from an arbitrary point. To illustrate, using curves 46 and 43 by moving 500 feet to the left of the intersection of curves 43 and 46 it may be found that the velocity is 165 feet per second on curve 43 and is 196 feet per second on curve 46. Thus it is apparent that the distance from the runway origin to the point of no return will be indicated on indicator 32 and as wheel 193 begins its rotation, wiper arm 177 is adjusted through clutch 191 which causes an unbalance to appear across control winding 167 of motor 166 so that motor armature 170 rotates and thereby subtracts the actual distance traveled down the runway from the computed distance to the point of no return which is displayed by the position of pointer 186 on indicator 32.

Since velocity is the time integral of acceleration it is evident that the same parameters control or influence acceleration and velocity, namely, pressure, temperature, weight of the aircraft, and whether the afterburner is on or off. These quantities are all used to adjust the voltage which represents the acceleration which appears across transformer winding 52 and is a function of the total thrust of the aircraft divided by the weight of the aircraft. Therefore the voltage appearing on switch arm 82 is representative of the computed acceleration that can be expected from the aircraft under the set of conditions which were manually set into the computer. This voltage is then sent to accelerometer 30 by the way of odometer 37 which will now be explained. A potentiometer 207 comprises a wiper arm 211 and a resistive element 210 which is connected to switch arm 82 through a connecting lead 212. Wiper arm 211 is connected to switch contact 86 of switch 81b. Another potentiometer 214 comprises a wiper arm 216 and a resistive element 215 which is connected to the end of resistive element 210 opposite connecting lead 212, by a connecting lead 217. The other end of resistive element 215 is connected to ground 66 through a resistor 220. Wiper arm 216 is connected to switch contact 87. It will be remembered that common shaft 187 positions wiper arms 177, 216, and 211 in accordance with the distance the aircraft wheel has traveled down the runway. By observing the position of switch arm 85, it may be seen that potentiometer 207 or 214 will modify the acceleration voltage seen on connecting lead 212 so that if the engine afterburner is on, switch arm 85 will be in contact with switch contact 86 and as the aircraft proceeds down the runway the acceleration will be increased with the afterburner on, and conversely, when switch arm 85 is in contact with contact 87, the voltage appearing on switch arm 85 is reduced as the runway distance increases due to the movement of wiper arm 216 towards the electrical ground 66.

Accelerometer 30 is of the nonpendulous seismic mass type supplying a linear acceleration signal. The linear acceleration signal is provided by a potentiometer 222 comprising a wiper arm 224 and a resistive element 223 which is connected in parallel with transformer secondary winding 55 by a pair of connecting leads 225 and 226. One end of resistive element 223 is connected to switch arm 85 by a connecting lead 227.

Amplifier discriminator 23 is excited by an alternating voltage through a pair of connecting leads 230 and 231. Connecting lead 231 is also connected to ground 66. Amplifier 23 is also connected to wiper arm 224 by a connecting lead 232. Amplifier discriminator 23 may be of the type shown in the Robert R. Chapman Patent 2,547,621. Relay 24 has a voltage coil 233 which has one end connected to ground 66 and the other end connected to the output of amplifier discriminator 23 through a connecting lead 234. Relay 24 has a pair of contacts 236 and 237 and a contact arm 235 which engages contact 236 during normal operation of the acceleration detecting system. A switch 240 has a switch arm 241 and a contact 242 which are closed at any point representative of a distance short of the point of no return. This is accomplished by a raised portion of cam 185 which presses switch arm 241 against contact 242. Secondary winding 58 is connected to relay contact arm 235 through a connecting lead 243 and the other end of transformer winding 58 is connected to one side of a lamp 244 through a connecting lead 245. The other side of lamp 244 is connected to ground 66. Contact 237 of relay 24 is connected to switch arm 241 through a connecting lead 246 and the circuit is completed by a connecting lead 247 which is connected to ground 66 and switch contact 242. Thus it may be seen that a voltage representative of the computed acceleration, is modified by runway distance to increase or decrease its magnitude, depending on whether the afterburner is on or off. This voltage appears on switch arm 85 to be combined at transformer winding 55 with the true acceleration signal from accelerometer 30, so that a signal will appear on wiper arm 224 which will indicate whether the computed acceleration is more or less than the actual acceleration and this signal will be sent to amplifier discriminator 23. Amplifier discriminator 23 will not lower the voltage supplied to coil 233 of relay 24 as long as the actual acceleration exceeds the computed acceleration. Therefore, relay 24 which has contact arm 235 impressed against contact 236 remains energized so that the abort signal will not appear to illuminate lamp 244. However, if the actual acceleration detected by accelerometer 30 is less than the computed acceleration, amplifier-discriminator 23 will cause relay coil 233 to be deenergized and contact arm 235 will be dropped across contact 237 to complete the circuit and cause lamp 244 to become illuminated indicating that the take-off run should be stopped.

FIGURE 4 shows certain improvements which can be made to refine certain features which appear in FIGURE 2. From FIGURE 2 it may be observed that an abort signal would appear at the origin of the runway until the acceleration of the aircraft had reached its normal value, which generally would be somewhere between 100 and 200 feet down the runway. While the system is operative, it may be objectionable to have the abort signal displayed, and therefore this feature would be overcome by the refinement shown in FIGURE 4. Also, a different scheme of keeping the abort signal off after reaching the point of no return is shown and an additional feature is shown which keeps the abort circuits actuated after receiving an abort signal so that the indication would not change until the trouble was detected and the take-off run initiated again. To begin with, a resistor 250 is connected to connecting lead 232 and a second resistor 251 is connected to the other end of resistor 250, with the end of resistor 251 opposite this connection being connected to amplifier 23. Assuming the aircraft is sitting at the end of the runway about to take-off the signal from the accelerometer 30 would be zero and an abort signal would be indicated on connecting lead 232 and amplifier-discriminator 23 to create an abort signal unless means is taken to prevent this signal from appearing. This is done by the use of a switch 252 having a section A and section B. Sections A and B of switch 252 are connected by a common link 253 which is actuated by shaft 187 in odometer 37. Switch 252A comprises a contact 255 and a switch arm 254 which is connected to ground 66. Switch 252B comprises contact 257 and a switch arm 256 which is connected to a tap of secondary winding 54 by a connecting lead 260. For this embodiment, relay 24 has an additional pair of contacts 262 and 263, and a contact arm 261 which is connected to contact 255 by a connecting lead 264. Completing the circuit to transformer secondary winding 58 is a connecting lead 265 which is connected to contact 262. As indicated above, the system of FIGURE 2 would indicate an abort signal since relay contact arms 235 and 261 would be in the position shown where the actual acceleration is short of that for a computed condition, however, switch 252 has its contact arms 253 and 254 opened and will remain opened until approximately 200 feet of the runway distance has been covered and then switch 252 will be closed by shaft 187. However, by the time the aircraft has gone approximately 100 to 150 feet the actual acceleration should overcome the computed acceleration and contact arms 235 and 261 will engage contacts 236 and 263 respectively thereby omitting the abort signal from reaching lamp 244. In the event there should be trouble however, the abort signal will be indicated, and to make sure that the signal does not change, a voltage which is picked up on connecting lead 260 from transformer secondary 54 will be transmitted through contact arm 256, to contact arm 235 through a connecting lead 266, and through contact arm 235 to amplifier 23 through a second connecting lead 267, which would supply a voltage that will at all times overcome any voltage received from accelerometer 30 and thereby hold the abort signal locked in its present mode of operation to provide an indication that the take-off should be aborted.

Once the aircraft has reached the point of no return, it is desirable to have the indication of an abort made nonoperative and this is accomplished by the following structure. A switch 270 has a contact arm 271 and a contact 272 which is connected to the junction of resistors 250 and 251 by a connecting lead 273. Contact arm 271 is connected to a voltage source through a connecting lead 274 and the circuit is completed by having the voltage common side connected to ground 66. When the aircraft reaches the point of no return, cam 185 closes contact arm 271 of switch 270 and thereby interjects a voltage at the junction of resistors 250 and 251 to place a voltage across resistor 251 which would be of a magnitude great enough to overcome the computed acceleration signal and thus relay 24 would remain in an energized position at all times. Resistors 250 and 251 are used in the circuit as current limiting resistors to prevent damage to other elements in the circuit. It may be seen that this type of additional refinement while not changing the basic concepts would improve the presentation to the pilot of the aircraft.

*Operation*

With power applied to the take-off monitor, the pilot adjusts control knob 142 to a position representing the atmospheric pressure and adjusts control knob 144 to indicate the ambient temperature at the point of take-off. Using the quantities of pressure and temperature to modify the voltage which appears on transformer windings 52 and 53, the take-off acceleration, take-off velocity, and braking velocity are all modified in accordance with the air density. The pilot then sets the weight control knob 146 to indicate the weight of the aircraft and sets switch 81 to indicate whether the afterburner is on or off. By the adjustment of the last two quantities it may be seen that the acceleration and velocity is further adjusted. It is also necessary to adjust switch 117 to indicate whether the runway conditions are dry or wet, which will give the desired braking coefficient. The pilot now presses the reset switch 197 to disengage contact arm 202 from contacts 196 and 200 and thereby allow magnetic clutch 191 to become deenergized. Upon the deenergization of coil 195 in magnetic clutch 191, spring 205 will return shaft 187 to its initial position and as it does so will cause wiper arms 177, 216, and 211 to be returned to a position representing zero runway length. It will be seen later that this does not affect the actual determination of the point of no return but would give a false indication of the point of no return at the time of setting null indicator 147, as the distance existing in odometer 37 would be subtracted from the distance to the point of no return unless the reset switch was initiated. If the aircraft is taxied between the time the computer is set up for a take-off and the take-off is initiated the odometer must be reset by the pressing of reset switch 197 when the aircraft is at the beginning of the runway. Control knob 140 must also be adjusted to indicate the length of the runway. The pilot then adjusts the null set control knob 153 which moves wiper arms 136 and 97 of potentiometers 134 and 95 respectively so that the take-off velocity and braking velocity are made equal by the indication of a null value seen on null indicator 147, and thus a distance representing the distance to the point of no return is determined since the point at which the velocities are equal is a function of runway length. As the null indicator is adjusted, shaft 152 which is driven by null set knob 153, also adjusts a wiper arm 156 of potentiometer 154. As wiper arm 156 was adjusted it created an unbalance in the control field network of motor 166 and thus a voltage is imparted to control field winding 167 causing armature 170 to rotate and thereby rotating pointer 186 to indicate the distance from the origin of the runway to the point of no return. As armature 170 rotates, it also rotates shaft 174 which would in turn move wiper arm 162 and thus reduce the voltage present on control field 167 until it reaches a null value or a voltage substantially at zero value and thus armature 170 would be driven to a fixed position representing the distance to the point of no return. It will be noted that as shaft 175 and 184 are rotated, cam 185 is driven against switch arm 241 to prevent switch arm 241 from becoming disengaged with contact 242 until the aircraft has reached the point of no return which would be at a 9 o'clock position of pointer 186 on indicator 32. This is done so that a warning cannot be given after reaching the point of no return.

Referring now to switch 81a and specifically to switch contact 82, a voltage will exist on switch contact 82 representative of the acceleration required under the conditions set in to the computer to enable the aircraft to become airborne, at or before, reaching the point of no return on the runway. It will be noted that the acceleration signal which is computed is first sent to odometer 37 to be modified in accordance with the distance traveled down the runway and this is done by moving wiper arms 211 and 216 in accordance with the distance traveled down the runway. If the afterburner of the jet engine is being used to increase the thrust during take-off, it will be noted that the voltage which appears on wiper arm 211 will be increased as the aircraft travels down the runway indicating that the acceleration is increasing from the value determined by the initial conditions. However, if the afterburner is not being used it will be noted that wiper arm 216 moves toward electrical ground 66 and thus the voltage appearing on wiper arm 216 is reduced, indicating that the acceleration tends to fall off as the aircraft makes its take-off run. This acceleration voltage which is modified by the take-off distance is sent to accelerometer 30 through connecting lead 227 and will appear on transformer secondary winding 55. As the aircraft accelerates down the runway, wiper arm 224 is positioned across resistive element 223 representing the actual acceleration sensed by the aircraft and this voltage is combined with the voltage present on secondary winding 55 in such a manner that the voltage appearing on connecting lead 232 would be of such magnitude and phase that amplifier discriminator 23 will or will not decrease the voltage across relay coil 233 and thus cause contact arm 235 to be dropped from contact 236 to 237 thereby completing the circuit which will energize lamp 244, located behind window 248 of indicator 232 and thus indicate to the pilot, that he should abort the take-off. The indicator 32 tells the pilot the distance remaining to the point of no return as wiper arm 177 of potentiometer 180 is driven in accordance with the runway distance traveled and unbalance is created in the motor control field network thus causing the armature to rotate in such a direction as to subtract the actual runway distance traveled from the distance to the point of no return. This is indicated by pointer 186 rotating, from a point representative of the distance from the origin of the runway, to the point of no return, the distance traveled being subtracted and appearing as the moving position of pointer 186. There are many possible dial presentations for the pilot and those shown are selected only for illustration.

While I have shown and described a specific embodiment of this invention, the invention should not be limited to the particular form shown and I intend in the appended claims to cover all modifications which do not depart from the spirit and scope of the invention.

I claim:

1. An aircraft take-off monitor comprising: first adjustable means having a first portion for computing a first acceleration signal and a second portion for computing a first velocity signal, said signals being representative of an aircraft runway acceleration and aircraft runway velocity scheduled as a function of a first set of predetermined conditions; second adjustable means for computing a second aircraft runway velocity signal representative of a braking velocity scheduled as a function of a second set of predetermined conditions; third means including indicating means connected to said second portion of said first adjustable means and second adjustable means having third adjustable means for changing the magnitude of said first and second velocity signals in accordance with runway distance until said signals are equal in magnitude; fourth means including second indicator means, said fourth means being connected to said third adjustable means so that said second indicator is adjusted simultaneously with said third adjustable means to represent a maximum take-off distance from the origin of the runway to a point of no return when said first and second velocity signals are equal in magnitude; fifth means including means driven by said aircraft connected to said second indicator means and said first portion of said first adjustable means to adjust said named means in accordance with the distance traveled by said aircraft from said runway origin; and sixth means including accelerometer means connected to said fifth means and thus to said first portion of said first adjustable means and said fourth means to provide a second acceleration signal representative of the actual acceleration of said aircraft, said sixth means supplying an abort signal when said actual acceleration becomes lower in magnitude than said computed acceleration as long as said second indicator means displays a distance greater than zero.

2. An aircraft take-off monitor comprising: first means having a first portion for computing a first aircraft runway acceleration signal and a second portion for computing a first aircraft runway velocity signal, said signals being representative of an acceleration and velocity scheduled as a function of a first set of predetermined conditions; second means for computing a second aircraft runway velocity signal representative of a braking velocity scheduled as a function of a second set of predetermined conditions; third means including indicating means connected to said second portion of the first means and to the second means for changing the magnitude of said first and second velocity signals in accordance with runway distance until said signals are equal in magnitude; fourth means including motor means, said fourth means being connected to said third means so that said motor means is adjusted by said third means to represent a point of no return when said first and second velocity signals are equal in magnitude; fifth means connected to said motor means and said second portion of said first means to also adjust said motor means in accordance with the distance traveled by said aircraft from said runway origin; and sixth means connected to said first portion of said first means and said fourth means, said sixth means, including means providing a second acceleration signal representative of the actual acceleration of said aircraft, supplying a danger signal when said actual acceleration becomes lower in magnitude than said computed acceleration as long as said runway distance displayed on said second indicator means is greater than zero.

3. An aircraft take-off monitor comprising: first computing means for computing a first aircraft runway acceleration signal and a first aircraft runway velocity signal, said signals being representative of an aircraft acceleration and an aircraft velocity scheduled as a function of a first set of predetermined operating conditions of said aircraft; second computing means for computing a second runway velocity signal representative of a braking velocity scheduled as a function of the length of runway and a second set of predetermined conditions; first adjustable means including signal sensitive means connected to said first and second computing means to respond to said velocity signals for equalizing said first and second aircraft velocity signals; indicating means connected to said first adjustable means so that said indicating means indicates a runway distance from the origin of said runway to a point of no return or maximum take-off distance to abort take-off when said first and second velocity signals are equal in magnitude; aircraft rolling distance measuring means connected to said indicating means and said first computing means to adjust said named means in accordance with the distance traveled by said aircraft from said runway origin to modify said first runway acceleration signal; and differential means including aircraft runway acceleration sensitive means connected to said distance measuring means and thus to said first computing means and said indicating means to provide a second acceleration signal representative of the actual acceleration of said aircraft, said differential means supplying an external warning signal when said actual acceleration becomes lower in magnitude than said computed acceleration signal as long as said indicating means displays a distance greater than zero.

4. In an aircraft a take-off monitor comprising: first means having a first portion for computing a first aircraft runway acceleration signal and a second portion for computing a first aircraft runway velocity signal as a function of a first set of predetermined aircraft operating conditions; second means for computing a second aircraft runway velocity signal as a function of a second set of predetermined conditions; first adjustable means connected to the second portion of said first means and to the second means and responsive to said velocity signals including means for adjusting said first and second means in accordance with runway distance for take-off of said aircraft and indicating when the magnitude of said first and second velocity signals are equal; means including second indicating means connected to said first adjustable means so that said second indicating means is adjusted by said first adjustable means to represent said runway distance from the origin of said runway to the point of no return when said first and second velocity signals are equal in magnitude; measuring means for measuring aircraft on the ground travel from said runway origin; means for connecting said second indicating means and said first portion of said first means to said measuring means, said measuring means adjusting said latter named means in accordance with said runway distance traveled; and comparison means connected to the measuring means including accelerometer means, providing a second acceleration signal representative of the actual runway acceleration of said aircraft, said comparison means supplying an output signal when said actual acceleration becomes lower in magnitude than said computed acceleration as long as said second indicating means displays a distance greater than zero.

5. An aircraft take-off monitor comprising: first adjustable means having a first portion for computing a first acceleration signal and a second portion for computing a first velocity signal, said signals being representative of the aircraft runway acceleration and aircraft velocity scheduled as a function of a first set of predetermined conditions; second adjustable means for computing a second velocity signal representative of the aircraft braking velocity scheduled as a function of a second set of predetermined conditions; third adjustable means including indicating means connected to said second portion of the first adjustable means and to the second adjustable means for changing the magnitude of said first velocity signal and said second velocity signal until said signals are equal in magnitude; fourth means including second indicator means, said fourth means being connected to said third adjustable means so that said second indicator is adjusted simultaneously with said third adjustable means to represent a runway distance equivalent to that to a point of no return when said first and second velocity signals are equal in magnitude; fifth means including means developing a second acceleration signal representative of the actual acceleration of said aircraft, said fifth means being connected to the first portion and developing a warning signal when said actual acceleration becomes lower in magnitude than said computed acceleration as long as said runway distance displayed on said second indicator means is greater than zero; and sixth means including means to adjust said second indicator and to further adjust said first portion of said adjustable means in accordance with the second integral of said actual acceleration of said aircraft.

6. An aircraft take-off monitor comprising: first adjustable means having a first portion for computing a first aircraft runway acceleration signal and a second portion for computing a first aircraft runway velocity signal, said signals being representative of the acceleration and velocity scheduled as a function of a first set of predetermined aircraft operating conditions; second adjustable means for computing a second aircraft runway velocity signal representative of the braking velocity scheduled as a function of a second set of predetermined conditions; third adjustable means including indicating means connected to said second portion of the first adjustable means and to the second adjustable means for changing the magnitude of said first velocity signal and said second velocity signal until said signals are equal in magnitude; fourth means comprising a second indicator connected to said third adjustable means so that said second indicator is adjusted simultaneously with said third adjustable means to represent a runway distance from the start of take-off run to a point of no return when said first and second velocity signals are equal in magnitude; fifth means including means driven by said aircraft during the take-off to adjust said second indicator means and to further adjust said first portion of said first adjustable means in accordance with the distance traveled from said runway origin or start of take-off run; and sixth means connected to the fifth means including means for developing an acceleration signal as a second derivative of said distance traveled from said runway origin, said sixth means developing a warning signal when said developed acceleration signal becomes lower in magnitude than said computed aircraft runway acceleration signal as long as said second indicator shows that the aircraft has not passed said point of no return.

7. An aircraft take-off monitor comprising: first adjustable means having a first portion for computing a first aircraft runway acceleration signal and a second portion for computing a first aircraft runway velocity signal, said signals being representative of the acceleration and velocity scheduled as a function of a first set of predetermined conditions; second adjustable means for computing a second aircraft runway velocity signal representative of the braking velocity scheduled as a function of a second set of predetermined conditions; third adjustable means including indicating means connected to the second portion of said first adjustable means and second adjustable means for changing the magnitude of said first velocity signal and said second velocity signal until said signals are equal in magnitude; a second indicator; fourth means connected to said third adjustable means so that said second indicator is adjusted simultaneously with said third adjustable means to represent a runway distance equivalent that from origin of the runway to a point of no return when said first and second velocity signals are equal in magnitude; fifth means for adjusting said second indicator means and to further adjust said first portion of said first adjustable means both adjustments being in accordance with the first integral of velocity of an aircraft; and sixth means connected to the fifth means and thus to the first portion including means for developing an acceleration signal as a first derivative of said velocity of said aircraft, said sixth means developing a warning signal when said developed acceleration signal becomes lower in magnitude than said computed acceleration signal as long as said second indicator shows that the aircraft has not passed said point of no return.

8. An aircraft take-off acceleration monitor comprising: adjustable means for computing a signal representative of the minimum normal aircraft runway acceleration under prevailing operating conditions; means responsive to craft acceleration for producing a signal representative of said aircraft runway acceleration; means for providing a signal representative of the runway distance said aircraft has traveled and connected to said adjustable means for adjustment thereof; and means including comparison means connected to said first and second named means to provide a warning signal when said second named signal becomes lower in magnitude than said first named signal so that the take-off may be abandoned.

9. An aircraft take-off acceleration monitor comprising: condition responsive means for computing a signal representative of the minimum normal runway acceleration of the aircraft as a function of a set of predetermined conditions; means responsive to aircraft runway accelerations for producing a signal representative of said aircraft actual acceleration; odometer means responsive to the displacement along the runway of said aircraft connected to said condition responsive means to adjust the magnitude of said computed signal representative of the minimum normal acceleration as a function of the runway distance traveled by said aircraft; and means including comparison means connected to said odometer and second named means to provide a warning signal when said first named signal becomes higher in magnitude than said second named signal.

10. In an aircraft runway distance monitor: means for computing a first signal representative of a distance from origin of the runway to a point of no return on a runway, said point of no return being a function of aircraft acceleration obtained from aircraft power means and aircraft braking characteristics; means operated by the craft displacement along the runway for providing a signal representative of the runway distance said aircraft has traveled; and means connected to said first and second named means to indicate the runway distance from the varying position of said aircraft to said point of no return whereby the pilot of the aircraft may ascertain whether he should abandon the take-off.

11. An aircraft runway distance monitor comprising: means for computing a first signal representative of a distance from the origin of a runway to a point of no return on a runway, said point of no return being determined by a velocity curve applicable to the aircraft take-off run and a velocity curve applicable to the aircraft braking run; means responsive to the first signal indicating the runway distance from said point of no return to the initial position of said aircraft; and distance measuring means responsive to runway displacement of said aircraft connected to said first and second named means to subtract the runway distance traveled by said aircraft from said distance from the initial position of said aircraft to said point of no return.

12. An aircraft runway distance monitor comprising: an analog computer for computing a first signal representative of a distance from origin of a runway or start of take-off run to a point of no return on a runway or last point along runway to abandon aircraft take-off, said point of no return occurring at a point when a velocity curve applicable to the take-off run and a velocity curve applicable to the braking run intersect; means responsive to craft displacement along runway for developing a signal representative of the runway distance said aircraft has traveled from origin of runway; and means connected to said analog computer and said second named means to indicate the runway distance from said point of no return to the varying present position of said moving aircraft.

13. An aircraft runway distance take-off monitor comprising: adjustable means for computing a first signal representative of a runway distance from the origin of a runway to a point of no return on a runway at last point along the runway to abandon a take-off of said aircraft, said point of no return being a function of aircraft velocity during the take-off run, aircraft velocity during the braking run, and runway length; means responsive to displacement of said craft on the runway for providing a signal representative of the runway distance said aircraft has traveled from the origin of said runway; and means connected to said first and second named means to indicate the difference between how far said aircraft has traveled from said runway origin and said runway distance from the origin to said point of no return.

14. An aircraft take-off monitor for use in correlating aircraft runway acceleration and available runway comprising: a first computer for computing a first signal representative of a distance of an origin of a runway to a point of no return on a runway, said distance to the point of no return being a mathematical function of both aircraft runway acceleration characteristics due to power and braking characteristics; a second computer included in said first computer for computing a second signal representative of the minimum aircraft normal runway acceleration under prevailing conditions during take-off; an accelerometer responsive to aircraft runway accelerations for producing a signal representative of actual horizontal acceleration of said aircraft including means connecting said second computer to said accelerometer; an odometer operated by said craft during take-off for providing a signal representative of the runway distance said aircraft has traveled during the take-off and opposed to said first signal; and an indicator including an amplifier-discriminator connected to said first and second computers, said accelerometer, and said odometer, said amplifier-discriminator providing a signal to said indicator when said signal representative of said aircraft actual acceleration becomes lower in magnitude than said second signal or computed acceleration signal, said indicator display remaining as long as such said runway distance signal modified by the odometer signal is greater than zero.

15. For use in an aircraft during take-off, a monitor comprising: first means for computing a first signal representative of the distance from the origin of the runway or origin of take-off run to the point of no return or the last point at which the take-off may be abandoned safely, said distance being a function of aircraft runway acceleration characteristics and braking characteristics; second means included in said first means for computing a second signal representative of the minimum normal runway acceleration under the prevailing conditions; third means responsive to movement of the craft during take-off run for producing a signal representative of substantially a horizontal longitudinal actual acceleration of said aircraft including fourth means connecting said second means to said third means; distance measuring means operated by the craft on the take-off run for providing a signal representative of the runway distance said aircraft has traveled during the take-off run; and fifth means including comparison means connected to said first, second and fourth means, and said distance measuring means, said comparison means providing a signal to said fifth means when said signal representative of said aircraft actual acceleration becomes lower in magnitude than said second or computed signal, said fifth means indicating said runway distance remaining from the actual position of said craft to said point of no return as long as said runway distance indicated by said fifth means is greater than zero, and further indicating when said signal provided by said comparison means exists.

16. For use in an aircraft during take-off, an aircraft take-off monitor comprising: first adjustable means for computing a first signal representative of the distance from origin of take-off run to a point of no return on a runway, said distance to the point of no return being a function such as an integration of aircraft runway acceleration during take-off run and braking or deceleration characteristics; second adjustable means included in said first adjustable means for computing a second signal representative of the minimum normal aircraft runway acceleration under prevailing conditions, at or before the aircraft reaching said point of no return; third means responsive to movement of said craft during take-off for producing a signal representative of the aircraft actual horizontal acceleration along the longitudinal axis of said aircraft, and connecting said second adjustable means to said third means; fourth means operated by said first adjustable means and aircraft during take-off for providing a signal representative of the runway distance remaining from the aircraft to said point of no return; and fifth means including comparison means connected to said first and second adjustable means and, said third and fourth means, said comparison means being connected to the second adjustable means and third means and providing a signal to said fifth means when said signal representative of said aircraft actual acceleration becomes lower in magnitude than said second or computed acceleration signal, while said fifth means is indicating said runway distance remaining to said point of no return and as long as said runway distance is indicated by said fifth means and further indicating when said signal provided by said comparison means exists.

17. An aircraft take-off monitor for correlating aircraft runway accelerations and available runway distance comprising: first means for computing a first signal representative of a point of no return on a runway, said point of no return being a mathematical function of aircraft acceleration, braking characteristics and length of runway; second means for computing a second signal representative of the minimum normal aircraft runway acceleration under prevailing conditions, at or before said aircraft attains said point of no return during take-off; third means sensing runway acceleration of the aircraft for producing a signal representative of said aircraft actual acceleration, and connecting said second means to said third means; fourth means responsive to said first means and runway displacement of said aircraft for providing a signal representative of the runway distance remaining from said aircraft to said point of no return; and fifth means including comparison means connected to said first, second, third and fourth means, said comparison means providing a signal when said signal representative of said aircraft actual acceleration becomes lower in magnitude than said second signal, said fourth means indicating said runway distance remaining to the point of no return as long as said runway distance indicated by said fourth means is greater than zero, and further determining when said signal provided by said comparison means may exist.

18. A take-off monitor for an aircraft proceeding down a runway for correlating aircraft runway acceleration and runway distance available comprising: means for computing a first signal dependent on said length of runway representative of the point of no return on a runway, said point of no return being also a function of aircraft acceleration and braking characteristics; means driven by said aircraft while so proceeding for providing a signal representative of the runway distance said aircraft has traveled; third means connected to said first and second named means to indicate the runway distance from the existing position of said aircraft to said point of no return; fourth means for computing a signal representative of the minimum acceptable acceleration of an aircraft about to take off under the prevailing conditions; fifth means respective to aircraft acceleration for producing a signal representative of said aircraft actual acceleration; sixth means including a comparison means connected to said first and second acceleration means to provide a warning signal when one acceleration signal becomes lower in magnitude than the other acceleration signal; and seventh means responsive to runway travel of the aircraft to prevent establishment of the warning signal if the remaining runway distance from the existing position of said aircraft to said point of no return is reduced to zero.

19. A monitor for the take-off roll of an aircraft comprising: a computer means for computing a signal representative of a minimum normal runway acceleration for an aircraft; an accelerometer means responsive to aircraft runway acceleration for producing a signal representative of the actual acceleration of the aircraft; signal comparator means connected to said first and second signal means and providing an output when one of said signals becomes lower in magnitude than the other; means controlled by said computer means and including means adjusted in accordance with the length of said runway for computing a third signal representative of a point of no return on the runway in the take-off roll for said aircraft; means responsive to the craft runway travel and said computing means indicating the remaining runway distance from said point of no return to the actual position of said aircraft; further signal means operated by the output of said comparator; and means preventing energization of said further signal means if the remaining distance of the aircraft to the point of no return is reduced to zero.

20. In an aircraft a take-off monitor for correlating craft acceleration and runway travel comprising: means for computing a first signal representative of the minimum normal runway acceleration for an aircraft about to take off; means on said aircraft for producing a second signal in accordance with the actual runway acceleration of said aircraft; odometer means responsive to displacement of said aircraft connected to said first means to adjust the magnitude of said first signal representative of the minimum normal runway acceleration as a function of the runway distance traveled by said aircraft; comparing means connected to said first and second named means to provide a warning signal when one of said two signals becomes lower in magnitude than the other; means dependent on the length of the runway for computing a third signal representative of a point of no return on the runway for said aircraft; means responsive to said odometer means for providing a fourth signal representative of the runway distance said aircraft has traveled; and further means connected to said third and fourth named signal means to indicate the runway distance remaining from the existing position of said aircraft to said point of no return, whereby the take-off may be abandoned when said one signal is lower if such runway distance remains.

21. The apparatus of claim 19, including additional means operated with the further means to prevent the giving of said warning signal if the runway distance from the position of said aircraft to said point of no return has been reduced to zero.

22. In a device to monitor the take-off of an aircraft: means responsive to the aircraft runway acceleration during take-off of an aircraft; means for ascertaining the initial distance on the runway to the point of no return of said aircraft or maximum take-off distance; means responsive to aircraft runway travel for adjusting the initially ascertained distance to the point of no return in accordance with the actual distance traveled by the aircraft; warning signal means operated by said acceleration means; and means preventing energization of said warning signal means if the present distance of said moving aircraft to the point of no return or remaining take-off distance has been reduced to zero so that the take-off is not abandoned if the warning signal is unoperated.

23. Apparatus whereby an aircraft may be caused to take-off safely comprising: an accelerometer means on the craft responsive to the actual linear runway acceleration of an aircraft; means including signal means providing a warning signal when the actual runway acceleration of said aircraft is less than a prescribed magnitude of runway acceleration; further means displaced in accordance with the distance from the beginning of a take-off roll to the point of no return on the runway for the aircraft; indicator means controlled by the craft and responsive to the runway displacement of said craft from the beginning of said take-off roll and also controlled by the further means whereby upon the existence of such warning signal and should the runway displacement of said aircraft be less than the distance from beginning of the take-off roll to the point of no return the proposed take-off of said aircraft may be abandoned.

24. A monitor for the take-off of an aircraft comprising: sensing means responsive to the linear runway acceleration during take-off of an aircraft; further means dependent on length of runway for providing the permissible take-off distance along the runway from the aircraft position to the point of no return of the aircraft; additional means responsive to the displacement of the craft down the runway; warning signal providing means operated by said sensing means; and safety means responsive to both the further means and additional means preventing operation of said warning signal means if the existing distance of said moving aircraft to the point of no return has been reduced to zero so that the take-off is not abandoned.

25. An aircraft take-off acceleration monitor comprising: manually settable means computing and producing a signal representative of the minimum acceptable aircraft runway acceleration; selectively adjustable means for modifying said computed acceleration in accordance with the prevailing aircraft flight conditions such as weight of aircraft and ambient temperature; linear acceleration means responsive to the runway acceleration of said aircraft producing a signal representative of said aircraft acceleration; and means including signal comparison means connected to said selectively adjustable means and said third named means providing a warning signal when said first named signal as modified is greater in magnitude than said runway acceleration signal.

26. An aircraft take-off acceleration monitor while the craft is on its take-off roll comprising: a manually controlled computer for computing initially a signal representative of the minimum normal acceleration necessary for takeoff; adjustable means for modifying said minimum acceleration signal in accordance with prevailing environmental flight conditions of the aircraft; means for additionally modifying said signal in accordnace with the distance rolled by the craft on the runway; a linear accelerometer responsive to runway accelerations of said aircraft producing a second signal representative of actual aircraft acceleration; and an output signal generator including a comparator connected to be controlled by said modified first and second signals and providing an output warning signal when one of said signals controlling said signal generator becomes lower in magnitude than said other signal.

27. In an aircraft take-off acceleration monitor while the craft is on the take-off roll prior to becoming airborne in combination: adjustable means computing an initial acceleration signal voltage indicative of the acceleration that the craft should have at start of takeoff roll; means modifying said signal voltage in accordance with the magnitude of runway roll achieved by said aircraft; linear accelerometer means responsive to actual acceleration of the craft during the runway roll producing a second signal voltage; means combining said first named signal voltage as modified and said second singal voltage; and a warning signal providing means energized from said combining means when the modified first signal is greater than the second signal, while the craft is on the achieved part of the take-off roll.

References Cited in the file of this patent

UNITED STATES PATENTS

| | | | |
|---|---|---|---|
| 2,137,013 | Bradley | Nov. 15, | 1938 |
| 2,736,878 | Boyle | Feb. 28, | 1956 |
| 2,831,182 | Kamins | Apr. 15, | 1958 |
| 2,922,982 | Hoeskstra | Jan. 26, | 1960 |